R. C. BLUME.
PIPE COUPLING.
APPLICATION FILED AUG. 26, 1912.
1,086,641. Patented Feb. 10, 1914.
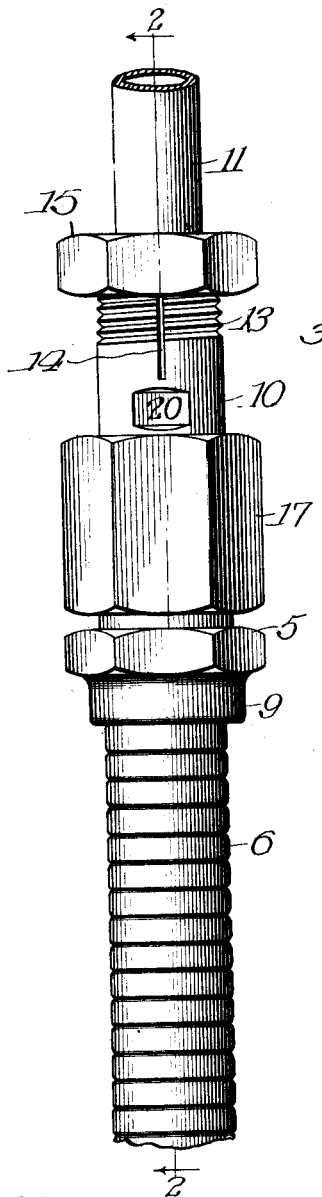
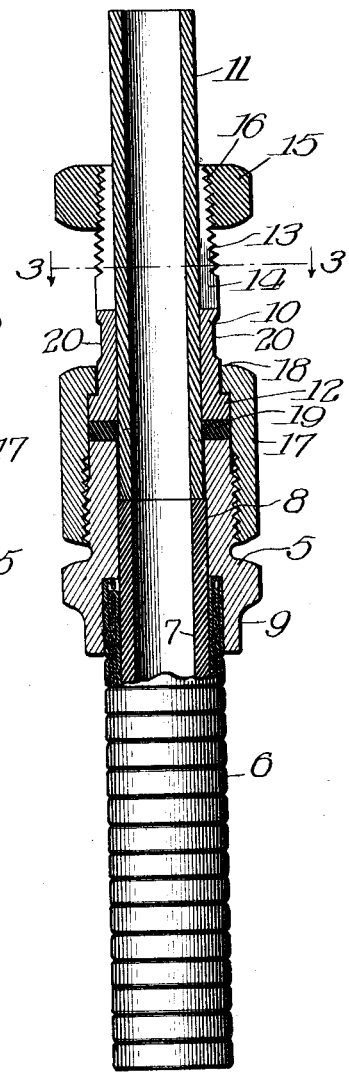
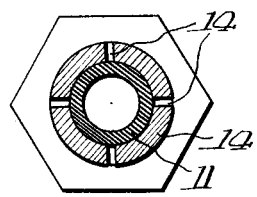
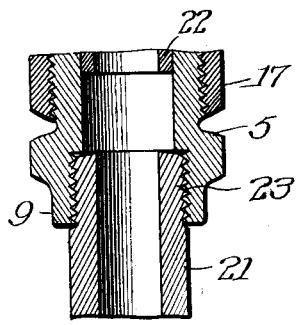
Witnesses:
Harold G. Barrett
Ira J. Wilson
Inventor
Robert C. Blume
by Lithicum, Belt & Tully Attys.

UNITED STATES PATENT OFFICE.

ROBERT C. BLUME, OF CHICAGO, ILLINOIS.

PIPE-COUPLING.

1,086,641.

Specification of Letters Patent.

Patented Feb. 10, 1914.

Application filed August 26, 1912. Serial No. 717,017.

*To all whom it may concern:*

Be it known that I, ROBERT C. BLUME, a citizen of the United States, residing at Chicago, in the county of Cook and State of Illinois, have invented new and useful Improvements in Pipe-Couplings, of which the following is a specification.

This invention relates to novel improvements in pipe couplings and is designed, primarily, to provide an efficient coupling of simple and inexpensive construction for connecting two soft metal pipes or a soft metal pipe to a hard metal pipe in a secure manner and without injury to the pipes.

My invention is especially adaptable for connecting a soft metal lined flexible pipe to the block tin pipe which forms a part of the draft mechanism for soda water, beer and the like. Soda water fountains and beer coolers are customarily provided with block tin supply pipes which pass through the floor and are connected by rubber hose with the supply tanks or barrels. I contemplate the use of flexible tubing lined with block tin for connecting the block tin supply pipe with the tank or barrel. This flexible tubing may be of any suitable character and properly lined with block tin and it is more sanitary and economical than the rubber hose heretofore used and presents many other advantages apparent to those skilled in the art. In order that the flexible tubing may be readily and properly connected with the end of the permanent supply pipe to which the rubber hose was formerly connected, I have produced the improved coupling which forms the subject-matter of this application and which will secure the end of the supply pipe and the end of the flexible tubing together in juxtaposition without injury to the pipe and so that there will be no leakage and no opportunity for the accumulation of matter which would render the apparatus insanitary.

In the accompanying drawings illustrating the invention Figure 1 is an elevation showing the coupling as it appears in actual use; Fig. 2 is a central sectional view on the line 2—2 of Fig. 1; Fig. 3 is a transverse sectional view on the line 3—3 of Fig. 2; and Fig. 4 shows the coupling constructed for connecting a solid metal pipe to a soft metal pipe.

Referring to the drawings, a collar 5 is rigidly mounted on the end of the flexible tubing 6 in a suitable manner. The flexible tubing may be removed to expose a part of the block tin lining 7 and the collar bored at 8 to receive this exposed end of the lining and at 9 to receive a part of the flexible covering. The flexible tubing may be secured within the collar by soldering the block tin lining thereto or in any other manner. A sleeve 10 is arranged on the soft metal pipe 11 and this sleeve has an annular shoulder 12 at one end and is tapered and provided with a thread 13 at its other end. The sleeve is split and divided into a number of sections by longitudinal slots 14 extending throughout the threaded portion 12 to permit of expansion and contraction. A nut 15 having a tapered threaded opening 16 engages the threaded portion of the sleeve to secure the latter on the pipe 11. A locking nut 17 is arranged on the sleeve and has an inwardly extending annular flange 18 to engage the shoulder 12 of the sleeve. This nut is interiorly threaded to engage an exterior thread on the collar 5 whereby the collar and sleeve comprising the two members of the coupling may be secured together with the end of the block tin lining 7 of the flexible tubing 6 in juxtaposition to the end of the pipe 11. A gasket 19 of suitable character is located between the ends of the collar 5 and the sleeve 12 to form a fluid tight joint.

My invention provides a coupling of simple construction which requires no special skill for its application and this is especially important by reason of the particular uses for which the coupling is adapted as it will often be applied by persons of little or no skill in such matters. The flexible tubing will be supplied with the collar permanently secured thereto and it can be connected with the end of the block tin supply pipe for soda fountains or beer coolers which usually projects a short distance from the ceiling of the basement or cellar, the draft mechanism being located on the floor above.

In practice the sleeve carrying the nuts loosely is first slipped on to the block tin supply pipe and the gasket is placed on said pipe against the lower end of the sleeve. Then before fastening the sleeve on the supply pipe the end of said pipe, which projects below the sleeve, is inserted in the collar and abutted against the block tin lining 7 of the flexible tubing. Then the collar is held in fixed position and the locking nut 17 is adjusted to tightly secure the sleeve and the collar together after which the tapered nut 15 is adjusted to securely lock the sleeve upon the supply pipe. The divided sleeve can be readily arranged on the supply pipe and by reason of its taper and the tapered nut it can be securely locked in position on the pipe. The interior surface of this sleeve may be threaded or serrated or otherwise roughened to bite the supply pipe if desired, but this is not necessary. When the nut 15 is tightened the sleeve should be held by engaging the flattened parts 20 with a wrench to prevent turning and likewise the collar is held in fixed position to prevent turning while the nut 17 is tightened.

I have shown in the drawings one form of flexible tubing which may be used to advantage but my invention can be employed in connection with any flexible tubing suitable for the purpose including those formed entirely of metal as well as those formed partly of metal and partly of other materials or wholly of non-metallic materials, the block tin lining forming in every case a flexible and suitable lining for the tubing and avoiding contamination of the fluid passing therethrough. This block tin lining for flexible tubing, however and of whatever the tubing is made, is especially important for sanitary reasons in the uses hereinbefore mentioned as well as to prevent leakage.

My invention can also be used for connecting a hard metal pipe 21 with a soft metal pipe 22, as shown in Fig. 4, in which case the collar would be threaded at 23 to receive the threaded end of the pipe 21.

I claim:

The combination of a soft metal pipe, an armor surrounding said soft metal pipe and terminating inwardly of the end of said pipe, a collar embracing said armor and reduced in diameter beyond the end of said armor and fitting the end of said pipe beyond the armor, the end of the said collar extending beyond the end of said pipe, the said armor being secured to said collar, a second pipe fitting within said collar and abutting against the end of the first mentioned pipe within the collar, a second collar fitting said second pipe and being split at intervals from one end throughout a part of its length and having an enlargement at the unsplit end, a nut threaded on said collar over said split portion and serving to clamp the said sleeve to said second mentioned pipe, a sleeve having an inwardly extending shoulder embracing said first mentioned collar beyond said split portion and abutting against its enlargement and threaded upon said first mentioned collar, and a gasket interposed between adjacent portions of said collars, said gasket serving to permit the ends of said pipes to be drawn into firm abutting contact before said collars are moved to contact one with the other while maintaining a yielding pressure between the collars.

ROBERT C. BLUME.

Witnesses:
Wm. O. Belt,
M. A. Kiddie.

Copies of this patent may be obtained for five cents each, by addressing the "Commissioner of Patents, Washington, D. C."